United States Patent [19]

Izawa et al.

[11] 3,789,054

[45] Jan. 29, 1974

[54] PROCESS FOR PRODUCING POLYPHENYLENE ETHERS

[75] Inventors: Shinichi Izawa, Tokyo; Kunio Toyama, Kanagawa; Yoshiaki Sugawara, Kanagawa; Tsutomu Tanaka, Kanagawa; Hidehiro Okamoto, Kanagawa, all of Japan

[73] Assignee: Asahi-Dow Limited, Tokyo, Japan

[22] Filed: Dec. 6, 1971

[21] Appl. No.: 205,375

[30] Foreign Application Priority Data
Dec. 8, 1970 Japan............................. 45-108107

[52] U.S. Cl. .......................................... 260/47 ET
[51] Int. Cl. ............................................ C08g 23/18
[58] Field of Search ................................ 260/47 ET

[56] References Cited
UNITED STATES PATENTS
3,306,874  2/1967  Hay........................................ 260/47
3,306,875  2/1967  Hay........................................ 260/47
3,405,092  10/1968  Meijs et al. ........................... 260/47

Primary Examiner—Melvin Goldstein
Attorney, Agent, or Firm—Cushman, Darby & Cushman

[57] ABSTRACT

Polyphenylene ethers of 5 microns or more in particle size which are useful for preparation of parts of electric devices are continuously produced according to oxidative polymerization of 2,6-disubstituted phenols by preparing a 15 to 35 % (by weight) solution of 2,6-disubstituted phenol in dimethylformamide or in a mixed solvent composed of toluene and methanol, subjecting the solution to polymerization in one zone while maintaining the reaction system in the state of a homogeneous solution, and transferring the polymerization liquid to another zone to complete the polymerization while allowing the resulting polymer to precipitate.

10 Claims, No Drawings

PROCESS FOR PRODUCING POLYPHENYLENE ETHERS

BACKGROUND OF THE INVENTION

1. Field of the Invention

This invention relates to a process for continuously producing polyphenylene ethers of 5 microns or more in particle size by oxidative polymerization of 2,6-disubstituted phenols.

Polyphenylene ethers are useful as thermoplastic resins having favorable thermal, mechanical and electrical properties and excellent in such chemical properties as alkali resistance, acid resistance, hot water resistance and the like.

2. Description of the Prior Arts

As to the production of polyphenylene ethers, many processes have heretofore been proposed. However, substantially all of these processes are carried out in a batch-wise manner using a solvent which dissolves both the starting phenol which is a monomer and the product polyphenylene ether which is a polymer. Relative to the continuous production of polyphenylene ethers, British Patent 1,087,488 discloses a process in which a phenol in the form of a homogeneous solution in toluene is polymerized by use of a column type two-stage polymerizer In said British patent, however, no mention is made with respect to the after-treatment step and no example is shown except the case where the monomer concentration is about 10 %. British Patent 1,051,399 discloses such a technique that in order to recover a polymer from a homogeneous toluene solution of said polymer, an azeotropic mixture of toluene and methanol is added to the polymerization solution to precipitate the polymer. Thus, said British patent teaches that for the polymerization process, it is also an important measure to simplify the recovery of the solvent toluene. So far as a homogeneous solution polymerization reaction is adopted, the polymerization solution is necessarily increased in viscosity. Accordingly, it is substantially impossible to increase the monomer concentration to more than 10 %. Further, a quite difficult technical problem is brought about in making continuous the step of recovering the polymer by mixing the polymerization solution with a precipitant. Moreover, the particle size of the polymer obtained is not more than 5 microns.

SUMMARY OF THE INVENTION

The present invention is a process for producing polyphenylene ethers having a particle size of 5 to 500 microns. Polymers having such a large particle size can be quite easily filtered, washed and dried.

The present invention provides a process for producing polyphenylene ethers by the continuous polymerization of 2,6-disubstituted phenols having such a high concentration as 15 to 35 % by weight.

In accordance with the present invention, there is provided a process for producing polyphenylene ethers by subjecting a 2,6-disubstituted phenol to oxidative polymerization using a molecular oxygen-containing gas in the presence of a catalyst, characterized in that the concentration of the 2,6-disubstituted phenol in the whole polymerization reaction mixture is made 15 to 35 % by weight, and the polymerization is effected in two different zones, using a medium which can not dissolve a polyphenylene ether having a specific viscosity of 0.25 or more, but the phenol as well as the catalyst.

In the first zone, the polymerization is carried out while preventing the precipitation of polyphenylene ether, while in the second zone, the polymerization is carried out while permitting the precipitation of polyphenylene ether.

According to the present process, the continuous polymerization of phenol has been made possible. This is not only because the medium is suitably selected so as to precipitate the polymer to the form of particles but also because the polymerization conditions at each stage are suitably controlled so as to obtain optimum particles.

For practice of the present process, there are required a first polymerizer in which the polymerization is proceeded while maintaining the reaction mixture in the form of a homogeneous solution, and a second polmerizer in which stable particles of polyphenylene ether are deposited. If necessary, a third polymerizer is provided to control the final properties of the polymer particles by aging. Each of these polymerizers may be subdivided into several polymerizers in order to carry out more delicate control.

DESCRIPTION OF THE PREFERRED EMBODIMENTS

A. Materials

The 2,6-disubstituted phenol is a phenolic compound represented by the general formula,

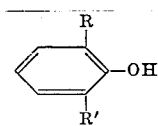

wherein R is a straight chain alkyl group having one to four carbon atoms; and R' is a halogen atom, an alkoxy group having one to four carbon atoms or an alkyl group having one to four carbon atoms. Examples of the above-mentioned compound include 2,6-dimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl- 6-methoxyphenol, 2-methyl- 6-propoxyphenol, 2-methyl-6-n-propylphenol, 2-methyl- 6-n-butylphenol, 2,6-di-n-propylphenol and 2-ethyl-6- chlorophenol.

Examples of the oxidative polymerization catalyst usable in the present process are catalysts comprising the combinations of cuprous salts and tertiary amines such as cuprous chloride-triethylamine, cuprous sulfate-tributylamine, cuprous acetate-N- methylmorpholine and cuprous chloride-pyridine; catalysts comprising the combinations of cupric salts, tertiary amines and alkali metal hydroxides such as cupric chloride-pyridine-potassium hydroxide cupric acetate- triethylamine-sodium hydroxide and cupric sulfate- N,N,N',N'-tetramethylethylenediamine-potassium hydroxide; catalysts comprising the combinations of cobalt salts and tertiary amines such as cobalt chloride-tributylamine and cobalt acetate-N,N,N',N'-tetramethylethylenediamine; catalysts comprising the combinations of manganese salts and tertiary amines such as manganese acetate-tributylamine and manganese acetylacetonate-pyridine; catalysts comprising the combinations of manganese salts and alcohol amines such as manganese acetate-ethanolamine, manganese stearate-diethanolamine and manganese acetylacetonate- β-hydroxyethyl ethylenediamine; and cobalt chelate system catalysts prepared by adding one or more of cocatalysts to a main catalyst. The main catalyst is selected from a group of cobalt compounds wherein water, oxygen, alcohol, amine or the like is coordinated with a cobalt chelate compound represented by the formula:

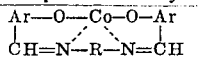

such as

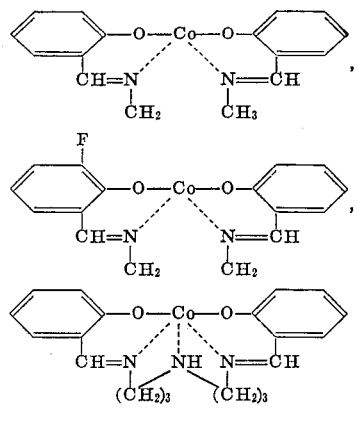

and

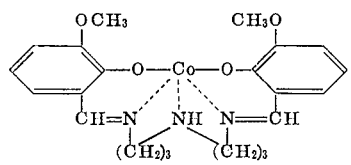

The cocatalyst is selected from the group consisting of such transition metal compounds as cobaltous chloride, cobaltic chloride, nickel chloride, ferrous chloride, ferric chloride, cobaltous acetate, ferrous acetate, ferric acetate, cobaltous propionate, nickel benzoate, cobaltous nitrate, ferrous nitrate, cupric nitrate, $Mn(CH_2COCH_2COCH_2)_2$, $Mn(CH_2COCH_2COCH_3)_2$, $Fe(CH_2COCH_2COCH_3)_2$, $Fe(CH_2COCH_2COCH_3)_3$, $Co(CH_2COCH_2COCH_3)_2$, $Co(CH_2COCH_2COCH_3)_3$, $Ni(CH_2COCH_2COCH_2)_2$, $Cu(CH_2COCH_2COCH_3)_2$ and $Zn(CH_2COCH_2COCH_3)_2$.

As the polymerization media, there are used those which dissolve the 2,6-substituted phenols but do not dissolve polyphenylene ethers having a specific viscosity η sp/c of not less than 0.25 among those obtained by the polymerization. Another condition required for the media used in the present invention is that they should be able to homogenously dissolve oxidative polymerization catalysts for phenols. The media and combinations thereof which are used in the present invention may be selected from an extremely wide scope. From the commercial standpoint, however, they are restricted in kind in consideration of such essentials as cost and easiness of recovery thereof. The medium compoisitions used in the present invention are limited to those which can give polyphenylene ethers having molecular weights within a practical range. Among various combinations of media, there are some which cannot be put into practical use because of their having no affinity for catalysts, even though they can sufficiently satisfy, with respect to solubility for monomers and polymers, conditions required for the media used in the present invention.

Examples of the media capable of being used alone include dimethylformamide, dimethylacetamide, trimethylene glycol, hexamethylene glycol, dimethyl sulfoxide, hexamethyl phosphotriamide, methylethylketone, diethylketone, acetyl acetone, benzylmethylketone and diethyl carbonate.

As the media to be used in the form of mixtures, there are used mixtures of solvents for the polymers with non-solvents for the polyers. Examples of the former solvents include benzene, toluene, xylene, chlorobenzene, dichlorobenzene, nitrobenzene, ethylbenzene, styrene, methylstyrene, dimethylstyrene, chlorostyrene, methylene dichloride, chloroform, dichloroethylene, trichloroethane, bromoform, benzontrile, furan, thiophene, cyclopentanone and cyclohexanone, Examples of the non-solvents for the polyers incude methanol, ethanol, n-propanol, iso-propanol, n-butanol, iso-butanol, tert-butanol, n-hexanol, n-heptanol, benzyl alcohol, cyclopentanol, cyclohexanol, water, acetonitrile, propionitrile, acrylonitrile, diethyl ether, tetrahydrofuran, pentane, n-hexane, 2-methylpentane, n-heptane, n-ocatane, iso-octane, cyclopentane, cyclohexane, dimethylformamide, dimethylacetamide, trimethylene glycol, hexamethylene glycol, dimethylacetamide, trimethylene glycol, hexamethylene glycol, dimethylsulfoxide, hexamethyl phosphotriamide, methylethylketone, diethylketone, acetylacetone, benzylmethylketone and diethyl carbonate.

In a case of mixture, the ratio between the solvents to the non-solvents is selected from the range of (9 to 1) to (1 to 9) by volume, taking into an account of molecular weight of the final polymer and stability of slurry obtained. If the solvent is more than 9 to 1, slurry is not satisfactory, and if the solvent is less than 1 to 9, it makes no substantial difference from using the non-solvents alone.

As the molecular oxygen-containing gas, there is used oxygen gas which may contain such inert gases as $N_2$ and the like. Air may also be used.

B. Process

B-1. First step

A solution of 2,6-disubstituted phenol in the aforesaid solution is subjected to oxidative polymerization in a first polymerizer, while introducing a molecular oxygen-containing gas and while maintaining the solution state, until the conversion becomes 50 to 95 %. That is, in the first polymerizer, the flow rate of oxygen-containing gas and the average staying time are suitably controlled so that the conversion is maintained within the range from 50 % to 95 % and no precipitate is deposited at all. At the same time, the heat of polymerization is sufficiently removed, taking advantage of the fact that the reaction system is a homogeneous solution. As the polymerizer, a complete mixing type polymerizer is used.

Since the oxidative polymerization reaction of phenol is a reaction in which the efficiency of contact of the phenol with oxygen gas is to be enhanced, sufficient stirring should be made in the reactor. That is, a polymerizer in which no stirring takes place in the direction of progress of the reaction liquid is not suitable in the case of handling a reaction mixture of such a low viscosity as in the present reaction.

In the present invention, the concentration of 2,6-disubstituted phenol is in the range from 15 to 35 % by weight, preferably from 18 to 33 % by weight. In order to obtain continuously a desirable slurry according to the present process, the monomer concentration should be at least 15 % by weight. If the monomer concentration is lower than 15 % by weight, particles of the deposited polymer slurry become extremely fine to make it difficult to carry out centrifugal separation, filtration, drying and the like operations on commercial scale. If the monomer concentration is higher than 35 % by weight, the adhesion of slurry to stirring rod, reactor wall, etc. takes place in the second step mentioned in the subsequent paragraph.

In the first step, the polymerization is effected in a substantially homogeneous solution state, while maintaining the conversion within the range from 50% to 95%. The oxidative polymerization of 2,6-disubstituted pehnol is an extremely great exothermic reaction, so that the heat of polymerization should sufficiently be removed. That is, in the first step, such a major portion of the reaction as in the range from 50 % to 95 % is effected, and the heat of polymerization is sufficiently removed, taking advantage of the fact that the reaction system is in a homogeneous solution state. If the reaction liquid, which is in such a state that the conversion is less than 50%, is transferred to a polymerizer for depositing polymer particles to the form of a slurry, there are undesirably brought about such drawbacks that the deposited particles are made unstable or a major portion of the reaction heat should be removed in the presence of slurry particles. If the reaction liquid is stayed in the first polymerizer until the conversion reaches more than 95 %, it becomes difficult to so control the reaction that the reaction liquid can be sent to the second polymerizer prior to the deposition to polymer particles.

Conditions for practicing the continuous polymerization reaction of the present invention are decided by investigating the optimum conditions of each factor so that the reactor can successfully play its role. The reaction temperature is selected from the range of 0° to 100°C., preferably 20° to 70°C. The average staying time of reaction liquid in the reactor is selected from the range of 15 minutes to 7 hours, preferably 30 minutes to 4 hours.

The feeding of oxygen gas to the reactor is an important factor for the control of reaction. The present polymerization proceeds as much as an amount of oxygen absorbed. Oxygen is fed in the first step so that an amount of oxygen to be absorbed is 50 to 95 % based on 2,6-disubstituted phenol in order to control the conversion to 50 to 95 %.

The present invention is enhanced if a solvent or non-solvent for polyphenylene ether or a mixture of said two solvents is added to the reaction system during the course of polymerization.

B-2. Second step

The reaction liquid, which has completed the polymerization in the first step, is sent by means of the head pressure into a second polymerizer. In the second polymerizer, the polymerization is completed while depositing polymer particles. The deposited polymer particles are prevented from adhesion to the reactor wall, stirring blades, etc. by the composition of medium, i.e. the combination of a solvent and a non-solvent and the quantitative ratio of the two solvents. For this purpose, a solvent or non-solvent for polyphenylene ether, or a mixture of said solvents, may be added. The size and hardness of the polymer particles can be controlled by maintaining the stirring conditions at the range of 10 to 500 r.p.m., depending upon particle size and hardness of precipitates. Oxygen may be fed in excess. The reaction temperature is from 0° to 100°C., preferably from 20° to 70°C., and the average staying time is from 15 minutes to 7 hours, preferably from 30 minutes to 4 hours.

B-3. Third step

In order to impart a suitable hardness to the polymer particles, there is sometimes used a third polymerizer as an aging tank. In this third polymerizer, the stirring conditions and the staying time are controlled so that the stirring is effected in 5 to 100 r.p.m., and the average staying time is 10 minutes to 10 hours, observing whether the desired slurry is obtained or not.

C. Product

The polymer obtained in the above manner has a particle size of 5 to 500 microns and is stable.

The present invention is illustrated in further detail below with reference to examples, in which all parts are by weight.

Example 1

A mixed liquid comprising 500 parts of 2,6-dimethylphenol, 127 parts of chloroform and 900 parts of toluene was fed at a rate of 4.6 liters/hr. by use of a metering pump to a first reactor of 3 liters in volume. Separately, a solution in 440 parts of methanol of 3 parts of cobaltous chloride, 10 parts of ethylenediamine and 20 parts of salicylaldehyde was fed to the first reactor at a rate of 1.4 liters/hr. by use of another metering pump. Into the first reactor, oxygen gas was introduced at a rate of 3.2 liters/min., and the inner temperature of the reactor was controlled to 25°C, under stirring (40 r.p.m.). Staying time was about 30 minutes. A homogeneous solution, which had left the first reactor, was sent by means of the head pressure to a second reactor of 8 liters in volume. Into the second reactor, oxygen gas was introduced at a rate of 1.0 liter/min, while maintaining the inner temperature at 35°C and while vigorously stirring the solution at 300 r.p.m. Polymer particles initiated to deposit in the second reactor, but were uniformly distributed within the whole reactor by stirring. The reaction liquid containing the polymer particles was overflowed from the second reactor and then transferred to a third reactor of 8 liters in volume. Into this reactor, oxygen gas was flowed at a rate of 0.3 liter/min. while stirring the reaction liquid at 80 r.p.m. The reaction liquid containing the polymer particles was continuously overflowed from the third reactor, and the then continuously subjected to filtration, washing and drying to obtain poly-(2,6-dimethylphenylenel,4-ether) as white particles. The thus obtained polymer particles were stable particles having diameters distributed within the range from 20 to 50 $\mu$. The intrinsic viscosity $\eta$ sp/c of the polymer measured in 0.5 % chloroform at 25°C. was in the range of $0.62 \pm 0.02$, and the operation could be effected stably over a long period of time.

Example 2

A mixed liquid comprising 500 parts of 2-methyl-6-ethylphenol, 740 parts of n-propanol and 1,240 parts of xylene was fed at a rate of 4.9 liters/hr. by use of a metering pump to a first reactor of 3 liters in volume. Separately, a solution of 4 parts of cuprous acetate and 25 parts of tri(n-butyl)amine in 490 parts of chloroform was fed to the first reactor at a rate of 1.1 liters/hr. by use of another metering pump. Into the first reactor, oxygen gas was flowed at a rate of 2.3 liters/min., and the inner temperature of the reactor was controlled to 30°C, under stirring. A homogeneous solution, which had left the first reactor, was sent by means of the head pressure to a second reactor of 8 liters in volume. Into the second reactor, oxygen gas was flowed at a rate of 0.8 liter/min., while maintaining the inner temperature at 40°C. and while vigorously stirring the solution at 240 r.p.m. Polymer particles initiated to deposit in the second reactor, but were uniformly distributed within the whole reactor by stirring. Thereafter, the same treatments as in Example 1 were repeated to obtain poly(2-methyl-6-ethylphenylene-1,4-ether) as white particles. The thus obtatined polymer particles were stable particles having diameters distributed within the range from 15 to 30 $\mu$. The intrinsic viscosity $\eta sp/c$ of the polymer measured in 0.5 % chloroform at 25°C. was in the range of 0.44 ± 0.02, and the operation could be effected stably over a long period of time.

Example 3

A mixed liquid comprising 450 parts of 2,6-dimethylphenol, 150 parts of n-butanol and 1,080 of ethylbenzene was fed at a rate of 8.4 liters/hr. by use of a metering pump to a first reactor of 3 liters in volume. Separately, a solution of 11 parts of a cobalt chelate represented by the formula,

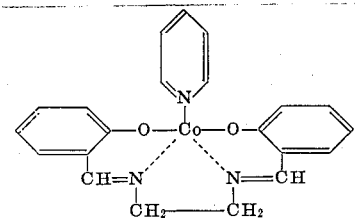

and 9 parts of $Cu(CH_2COCH_2CHCH_2)_2$ in 300 parts of methanol was fed to the first reaction at a rate of 0.6 liter/hr. by use of another metering pump. Into the first reactor, oxygen gas was flowed at a rate of 2.0 liters/min., and the inner temperature of the reactor was controlled to 25°C, under stirring. A homogeneous solution, which had left the first reactor, was sent by means of the head pressure into a second reactor of 8 liters in volume. Into the second reactor, oxygen gas was flowed at a rate of 0.6 liters/min. while maintaining the inner temperature at 80°C. and while vigorously stirring the solution at 350 r.p.m. Thereafter, the same treatments as in Example 1 were effected to obtain poly(2,6-dimethylphenylene-1,4-ether) as white particles. The polymer particules were stable particles having diameters distributed within the range from 25 to 30 $\mu$. The intrinsic viscosity $\eta sp/c$ of the polymer measured in 0.5 % chloroform at 25°C. was in the range of 0.71 ± 0.01, and the operation could be effected stably over a long period of time.

Example 4

A mixed liquid comprising 330 parts of 2,6-dimethylphenol, 130 parts of dichloroethylene and 810 parts of benzene was fed at a rate of 3.1 liters/hr. by use of a metering pump to a first reactor of 3 liters in volume. Separately, a solution of 5 parts of cuprous chloride and 30 parts of pyridine in a mixed solvent composed of 65 parts of methanol and 130 parts of n-propanol was fed to the first reactor at a rate of 0.9 liter/hr. by use of another metering pump. Into the first reactor, oxygen gas was flowed at a rate of 3.5 liters/min., and the inner temperature of the reactor was controlled to 40°C, under stirring. A homogenous solution, which had left in the first reactor, was sent by means of the head pressure to a second reactor of 8 liters in volume. Into the second reactor, oxygen gas was flowed at a rate of 1.0 liter/min., while maintaining the inner temperature at 50°C. and while vigorously stirring the solution at 250 r.p.m. Polymer particles initiated to deposit in the second reactor, but were uniformly distributed within the whole reactor by stirring. The reaction liquid containing the polymer particles was overflowed from the second reactor, and then transferred to a third reactor of 8 liters in volume which had been kept at 30° C. Into the third reactor, oxygen gas was flowed at a rate of 0.2 liter/min. while stirring the reaction liquid at 40 r.p.m. The reaction liquid containing the polymer particles was continuously overflowed from the third reactor, and then continuously subjected to filtration, washing and drying to obtain poly(2,6-dimethylphenylene-1,4-ether) as white particles. The thus obtained polymer particles were stable particles having diameters distributed within the range from 20 to 40 $\mu$. The intrinsic viscosity $\eta sp/c$ of the polymer measured in 0.5 % chloroform at 25°C. was in the range of 0.77 ± 0.03, and the operation could be effected stably over a long period of time.

Example 5

A mixed liquid comprising 600 parts of 2-ethyl-6-n-propylphenol, 300 parts of acetonitrile and 1,100 parts of dimethylstyrene was fed at a rate of 4.9 liters/hr. by use of a metering pump to a first reactor of 3 liters in volume. Separately, a solution of 5 parts of manganese acetate, 20 parts of tri(n-butyl)-amine and 5 parts of sodium methoxide in a mixed solvent composed of 200 parts of diethyl carbonate and 270 parts of ethanol was fed to the first reactor at a rate of 1.1 liters/hr. by use of another metering pump. Into the first reactor, oxygen gas was flowed at a rate of 4.0 liters/min., and the inner temperature of the reactor was controled to 35°C, under stirring. A homogeneous solution, which had left the first reactor, was sent by means of the head pressure to a second reactor of 8 liters in volume. Into the second reactor, oxygen gas was flowed at a rate of 1.2 liters/min., while maintaining the inner temperature at 45°C. and while vigorously stirring the solution at 400 r.p.m. Thereafter, the same treatments as in Example 1 were effected to obtain poly(2-ethyl-6-n-propylphenylene-1,4-ether) as white crystals. The thus obtained polymer particles were stable particles having diameters distributed within the range from 40 to 60 $\mu$. The intrinsic viscosity $\eta sp/c$ of the polymer measured in 0.5 % chloroform at 25°C. was in the range of 0.51 ± 0.02, and the operation could be effected stably over a long period of time.

Example 6

A mixed liquid comprising 700 parts of 2,6-dimethylphenol, 300 parts of propionitrile and 700 parts of mixed xylene was fed at a rate of 6.8 liters/hr. by use of a metering pump to a first reactor of 5 liters in volume. Separately, a solution of 6 parts of cupric acetate, 15 parts of triethylamine and 10 parts of potassium hydroxide in a mixed solvent composed of 260 parts of chloroform and 510parts of isopropanol was fed to the first reactor at a rate of 3.2 liters/hr. by use of another metering pump. Into the first reactor, oxygen gas was flowed at a rate of 7.0 liters/min., and the inner temperature of the reactor was controlled to 30°C, under stirring. A homogeneous solution, which had left the first reactor, was sent by means of the head pressure to a second reactor of 2.0 liters in volume. Into the second reactor, oxygen gas was flowed at a rate of 1.0 liter/min., while maintaining the inner temperature at 40°C. and while vigorously stirring the solution at 300 r.p.m. Polymer particles initiated to deposit in the second reactor, but were uniformly distributed within the whole reactor by stirring. The reaction liquid containing the polymer particles was continuously overflowed from the second reactor, and then continuously subjected to filtration, washing and drying to obtain poly(2,6-dimethylphenylene-1,4-ether) as white particles. The thus obtained polymer particles were stable particles having diameters distributed within the range from 10 to 70 μ. The intrinsic viscosity ηsp/c of the polymer measured in 0.5 % chloroform at 25°C. was in the range of 0.66 ± 0.05, and the operation could be effected stably over a long period of time.

We claim:

1. A process for producing polyphenylene ethers which comprises a first step of passing a molecular oxygen-containing gas in the presence of a catalyst into a solution of a 2,6-disubstituted phenol having the formula

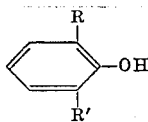

where R is a straight chain alkyl group having one to four carbon atoms and R' is a halogen atom, a n-alkoxy group having one to four carbon atoms or an n-alkyl group having one to four carbon atoms in a medium capable of dissolving the catalyst as well as the 2,6-disubstituted phenol but incapable of dissolving a polyphenylene ether having a specific viscosity of not less than 0.25, the amount of said 2,6-disubstituted phenol being 15 to 35 % by weight based on the total weight of the polymerization liquid, and keeping the polymerization liquid at a temperature of 0° to 100°C., while stirring and preventing the liquid from formation of precipitate, until 50 to 95 % of the 2,6-disubstituted phenol is polymerized; and a second step of transferring the reaction liquid in the form of a solution to another reaction zone, into which the oxygen-containing gas is introduced, while stirring the liquid and allowing the precipitation of polyphenylene ether at a temperature of 0° to 100°C., to complete the polymerization of the 2,6-disubstituted phenol.

2. A process according to claim 1 wherein the 2,6-disubstituted phenol is 2,6-dimethylphenol or 2,6-diethylphenol.

3. A process according to claim 1, wherein the medium is one member selected from the group consisting of dimethylformamide, dimethylacetamide, trimethylene glycol, hexamethylene glycol, dimethyl sulfoxide, hexamethyl phosphotriamide, methylethylketone, diethylketone, acetylacetone, benzylmethylketone and diethyl carbonate.

4. A process according to claim 1, wherein the medium is a mixture of at least one member selected from the group consisting of benzene, toluene, xylene, chlorobenzene, dichlorobenzene, nitrobenzene, ethylbenzene, styrene, methylstyrene, chlorostyrene, dimethylstyrene, methylene dichloride, chloroform, dichloroethylene, trichloroethylene, bromoform, benzonitrile, furan, thiophene, cyclopentanone and cyclohexanone, with at least one member selected from the group consisting of methanol, ethanol, n-propanol, isopropanol, n-butanol, isobutanol, tert-butanol, n-hexanol, n-heptanol, benzyl alcohol, cyclopentanol, cyclohexanol, water, acetonitrile, propionitrile, acrylonitrile, diethyl ether, tetrahydrofuran, pentane, n-hexane, 2-methylpentane, n-heptane, n-octane, iso-octane, cyclopentane, cyclohexane, dimethylformamide, dimethylacetamide, trimethylene glycol, hexamethylene glycol, dimethyl sulfoxide, hexamethyl phosphotriamide, methylethylketone, diethylketone, acetylacetone, benzylmethylketone and diethyl carbonate.

5. A process according to claim 1, wherein the reaction temperatures in both the first and second steps are individually 20° to 70°C.

6. A process according to claim 1, wherein the average staying times in both the first and second steps are individually 15 minutes to 7 hours.

7. A process according to claim 1, wherein the average staying times in both the first and second steps are individually 30 minutes to 4 hours.

8. A process according to claim 1, wherein the first step is carried out while removing the heat of polymerization as much as possible.

9. A process according to claim 1, wherein the reaction liquid is further subjected to a third step for aging.

10. A process according to claim 1, wherein each step is subdivided into two or more steps.

* * * * *